United States Patent
Mirring et al.

[11] Patent Number: 5,735,613
[45] Date of Patent: Apr. 7, 1998

[54] SINGLE- OR MULTIPLE-ROW CYLINDRICAL ROLLER BEARING

[75] Inventors: Knut Mirring, Gochscheim; Klaus Muschiol; Thomas Peuschel, both of Schweinfurt, all of Germany

[73] Assignee: SKF GmbH, Schweinfurt, Germany

[21] Appl. No.: 874,088

[22] Filed: Jun. 12, 1997

Related U.S. Application Data

[62] Division of Ser. No. 652,313, May 23, 1996, Pat. No. 5,660,483.

[30] Foreign Application Priority Data

May 26, 1995 [DE] Germany ............... 295 08 774 U

[51] Int. Cl.$^6$ ............................................. F16C 33/66
[52] U.S. Cl. ................................... 384/468; 384/475
[58] Field of Search ............................ 384/468, 474, 384/475, 564, 473, 476

[56] References Cited

U.S. PATENT DOCUMENTS

| | | | |
|---|---|---|---|
| 4,919,253 | 4/1990 | Morrison | 384/474 |
| 5,026,177 | 6/1991 | Masuda | 384/447 |
| 5,088,890 | 2/1992 | Jewess | 384/475 |
| 5,114,248 | 5/1992 | Harsdorff | 384/474 |

*Primary Examiner*—Lenard A. Footland
*Attorney, Agent, or Firm*—Cowan, Liebowitz & Latman, P.C.

[57] ABSTRACT

A roller bearing including inner and outer races defining an interior space therebetween, and a plurality of cylindrical rollers between the races, each race having opposite axial end surfaces, a seal situated at each end of the bearing, each seal including a loosely fitting flange ring extending radially between the races, the ring having an inner axial surface facing the axial end surface of the inner race, thereby defining facing end surfaces, the ring and the inner race respectively having bore surfaces, the inner race having at least one hole extending generally radially from the bore thereof to the interior space for supply lubricant to the interior space, and pressure equalizing passages communicating the interior space with the exterior of the bearing, the openings comprising at least one passage in one of the facing surfaces and at least one axial passage axially traversing the ring.

2 Claims, 2 Drawing Sheets

SINGLE- OR MULTIPLE-ROW CYLINDRICAL ROLLER BEARING

This application is a division of application Ser. No. 08/652,313, filed May 23, 1996, now U.S. Pat. No. 5,660,483.

BACKGROUND OF THE INVENTION

The invention concerns a single- or multiple-row cylindrical roller bearing consisting of two concentric races that at either axial end have radial flanges facing one another, where in each instance one of the facing radial flanges of a flange pair is provided with a seal which with the facing flange forms a sealing face, and of cylindrical rollers rolling between the races, and which is provided with holes for the supply of oil mist and with pressure-equalizing openings for ventilation of the bearing.

In cylindrical roller bearings the end faces of rolling members roll along the faces of fixed flanges or flange plates. Sliding friction occurs there the magnitude of which can be reduced only when sufficient lubricant can reach these areas. This is not always ensured in high-speed rolling bearings that are lubricated with oil mist.

It is known that in cylindrical roller bearings lubricated with oil mist at least one of the flanges may be provided with a plurality of passages running axially, where these passages, at least several of which are closed with removable stoppers, are arranged in the radial region between the raceway of the associated race and the sealing ring (DE-PS 3,223,007).

At the same time, these passages, which serve for ventilation, preferably are arranged at pitch circle level, i.e., in the region of the midpoint of the rollers. This means that the oil mist as a rule only reaches this region and not the region of the raceways or even the transitions of raceways and the flanges, where adequate lubrication would be very desirable.

The object of the present invention is to avoid this disadvantage and to procure a cylindrical roller bearing wherein even the raceways and, in particular, the critical areas at the transition from raceway to flange are sufficiently supplied with lubricant.

SUMMARY OF THE INVENTION

According to the invention, this object is accomplished in that the pressure-equalizing passages are arranged in the radial region between the raceway and the bore surface of the associated race. In this way it is provided that the oil mist reliably reaches the region of the raceway and, in particular, the region of transition between raceway and flange side face.

According to another feature of the invention, the pressure-equalizing passages may be arranged running radially between the raceway and bore surface of the associated race.

With loosely fitting flanges the pressure-equalizing passages preferably may be formed by a surrounding annular groove which is in communication with the interior space of the bearing, and at least one connecting channel starting from said interior space and communicating with the exterior. At the same time, according to additional features of the invention, the annular groove may be incorporated either into the flange at the face turned toward the associated race or in the race itself at the face turned toward the associated flange.

Starting from this annular groove, the connecting channels may be designed as through holes running axially or as axial grooves running in the region of the bore surface.

Various examples of the invention, which are to be described in detail below, are represented in the drawings.

DETAILED DESCRIPTION OF THE PREFERRED EMBODIMENT

Figure 1:
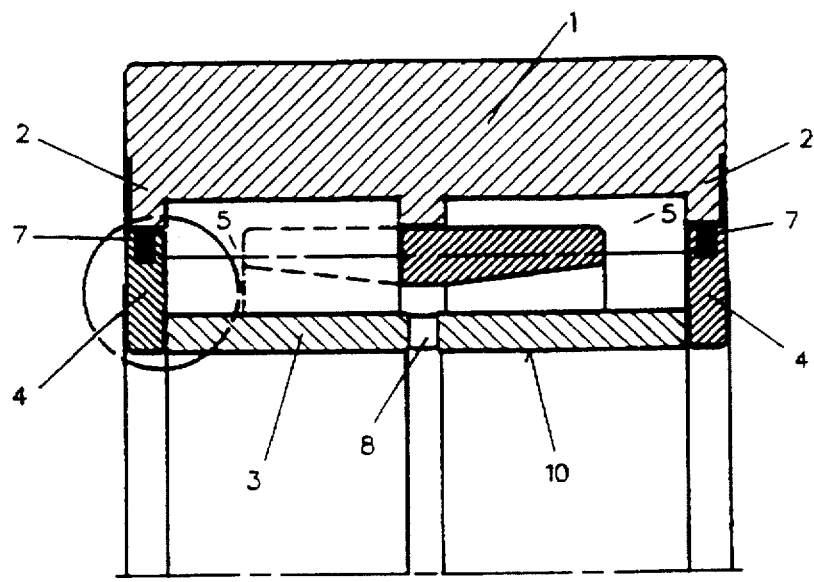
FIG. 1 shows a partial longitudinal section through a multiple-row cylindrical roller bearing.

The cylindrical roller bearing of FIG. 1 consists of the outer race 1, which at either axial end has a radial flange 2 formed in one piece with the race 1, the inner race 3 which is provided with a loosely fitting flange ring having a radially outward extending edge 4 facing the flange 2, as well as two rows of cylindrical rollers 5 rolling between the races 1 and 3. Loosely fitting flange ring 4 has a peripheral groove 6, in each instance open toward the fixed flange 2, in which slotted sealing ring 7 engages with little play. These sealing rings 7 are prestressed to bear against the flanges 2 of the outer race 1. The inner race 3 is provided with holes 8, through which oil mist is supplied to the bearing interior.

Figure 3:
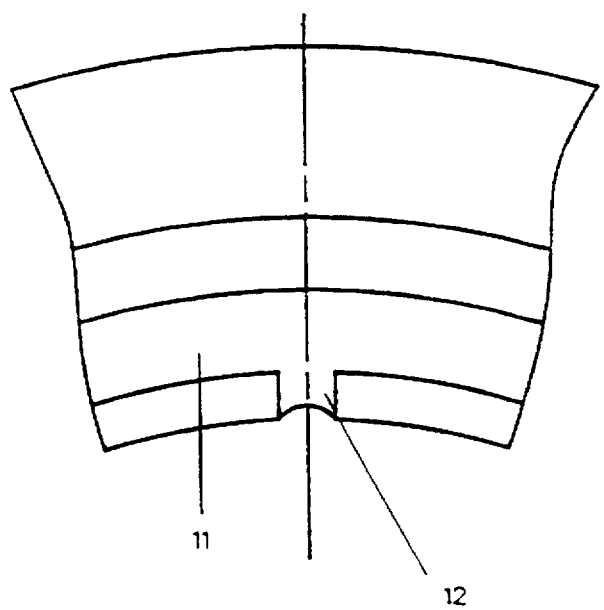
FIG. 3 shows a sectional view of the example of the present invention of FIG. 1.
Figure 2:
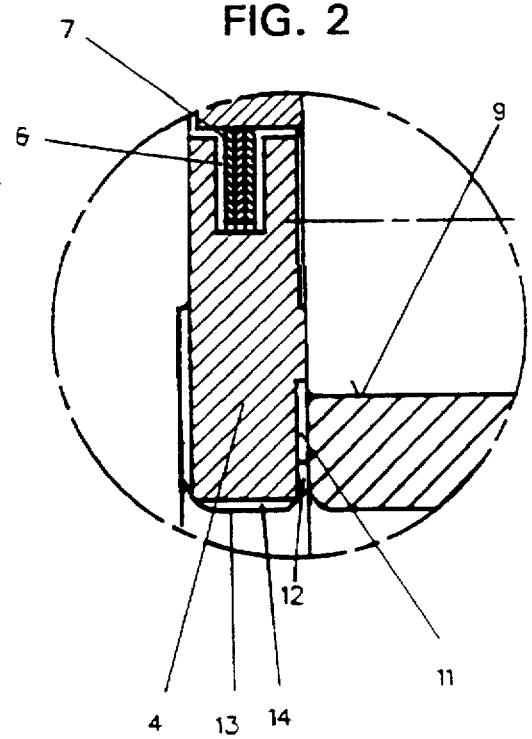
FIG. 2 shows a detail in the longitudinal section of FIG. 1 on an enlarged scale.

As can be seen in FIGS. 2 and 3, the loosely fitting flange ring 4 at the surface toward the inner race 3 in the radial region between the raceway 9 and the bore 10 is provided with a surrounding annular groove 11, which projects slightly beyond the raceway 9. In communication with this annular groove 11 are a plurality of ventilating grooves 12, distributed at the periphery and running radially, which in the region of the bore 13 open into grooves 14 running axially. In this way ventilation of the bearing interior is ensured through the annular groove 11 and the grooves 12 and 14.

Figure 4:
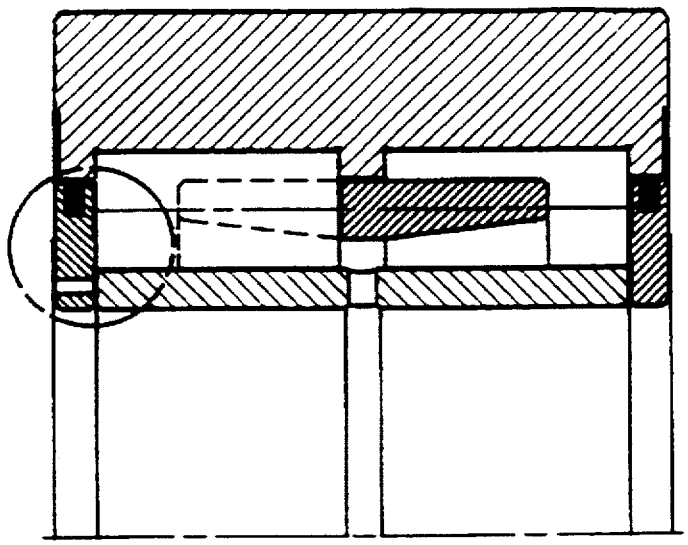
FIG. 4 shows another example in partial longitudinal section.
Figure 5:
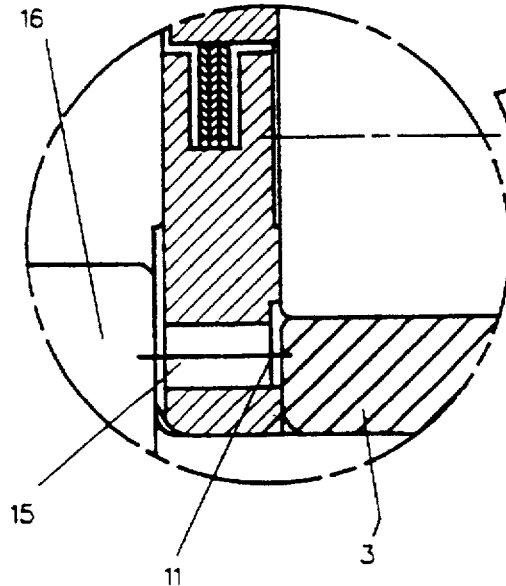
FIG. 5 shows a detail in the longitudinal section of FIG. 4 on an enlarged scale.
Figure 6:
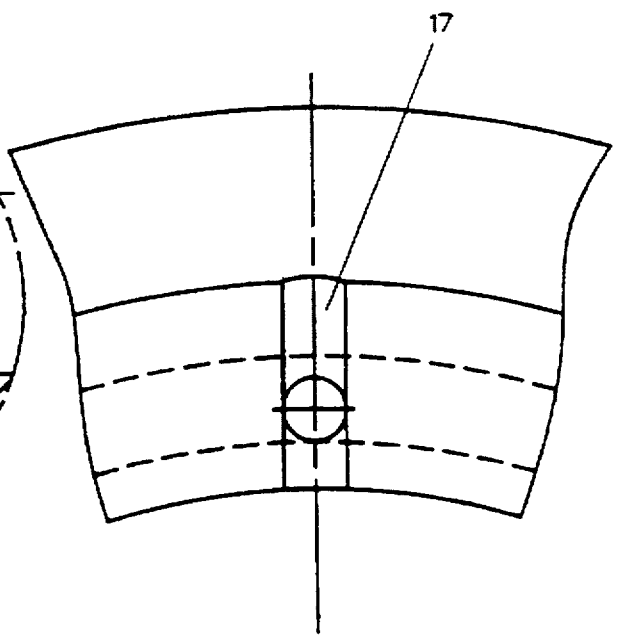
FIG. 6 shows a sectional view of the example of FIG. 4.

In the example of FIGS. 4 to 6 a surrounding annular groove 11 is provided in the loosely fitting flange ring 4 at the face turned toward the inner race 3. A plurality of passages 15, running axially and distributed on the periphery, open into the said annular groove 11. In order to produce a communication to the exterior despite the axial shoulder 16 against which the loosely fitting flange ring 4 rests, the flange ring 4, on the face turned toward the shoulder 16, is designed with a plurality of radial grooves 17 distributed on the periphery and in communication with the passages 15.

While in the examples described above, the supply and pressure-equalizing openings are provided in or in the region of the inner race, it is anyway possible to provide them in the region of the outer race raceway or on the facing sides.

What is claimed is:

1. A cylindrical roller bearing comprising inner and outer races and respective raceways defining an interior space therebetween, said races having at either axial end radial flanges facing one another forming a flange pair, where in each instance one of the facing radial flanges of said flange pair is provided with a seal which with the facing flange forms a sealing face, and a plurality of cylindrical rollers between said races, said inner race provided with at least one hole for supplying an oil mist, and one of said flanges comprising a loosely fitting flange ring which is provided with said seal, and wherein said bearing further comprises pressure-equalizing passages for ventilation of the bearing formed by an annular groove in said flange ring which is in communication with the interior space of the bearing and at least one connecting channel extending from said interior space and communicating with the exterior of the bearing, said connecting channel comprising a hole extending axially in communication with said annular groove.

2. A cylindrical roller bearing comprising inner and outer races and respective raceways defining an interior space therebetween, said races having at either axial end radial flanges facing one another forming a flange pair, where in each instance one of the facing radial flanges of said flange pair is provided with a seal which with the facing flange forms a sealing face, and a plurality of cylindrical rollers between said races, said outer race provided with at least one hole for supplying an oil mist, and pressure-equalizing passages for ventilation of the bearing, characterized in that the pressure-equalizing passages are situated in the radial region between an axial end of the outer race and one of said flanges adjacent thereto and where the radial region extends between the raceway and bore of said outer race.

* * * * *